United States Patent
Severinsky et al.

(10) Patent No.: US 6,338,391 B1
(45) Date of Patent: *Jan. 15, 2002

(54) HYBRID VEHICLES INCORPORATING TURBOCHARGERS

(75) Inventors: Alex J. Severinsky, Washington, DC (US); Theodore Louckes, Holly, MI (US)

(73) Assignee: Paice Corporation, Silver Spring, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 09/392,743

(22) Filed: Sep. 9, 1999

Related U.S. Application Data

(60) Provisional application No. 60/122,296, filed on Mar. 1, 1999.

(51) Int. Cl.$^7$ .................................................. B60K 6/04
(52) U.S. Cl. ........................................ 180/65.2; 60/602
(58) Field of Search ................................ 180/65.2, 65.3, 180/65.4, 65.8, 165; 60/706, 711, 716, 718, 602; 290/17, 40 R, 40 C; 322/16; 477/2, 3

(56) References Cited

U.S. PATENT DOCUMENTS

| | | |
|---|---|---|
| 1,824,014 A | 9/1931 | Froelich |
| 2,666,492 A | 1/1954 | Nims et al. |
| 3,211,249 A | 10/1965 | Papst |
| 3,454,122 A | 7/1969 | Grady, Jr. |
| 3,502,165 A | 3/1970 | Matsukata |

(List continued on next page.)

OTHER PUBLICATIONS

Simanaitis, "Electric Vehicles", *Road & Track*, May 1992, pp. 126–136.

Reynolds, "AC Propulsion CRX", *Road & Track*, Oct. 1992, pp. 126–129.

Kalberlah, "Electric Hybrid Drive Systems . . . ", SAE Paper No. 910247, 1991.

Bullock, "The Technological Constraints of Mass,Volume, Dynamic Power Range and Energy Capacity . . . " SAE Paper No. 891659 1989.

Electric and Hybrid Vehicle Technology, vol. SP–915, SAE, Feb. 1992.

Wouk, "Hybrids: Then and Now", *IEEE Spectrum*, vol. 32, 7, Jul. 1995.

Bates, "Getting a Ford HEV on . . . ", *IEEE Spectrum*, vol. 32, 7, Jul. 1995.

King et al, "Transit Bus takes . . . ", *IEEE Spectrum*, vol. 32, 7, Jul. 1995.

Yamaguchi, "Toyota readies gasoline/electric hybrid system", *Automotive Engineering*, Jul. 1997, pp. 55–58.

Wilson, "Not Electric, Not Gasoline . . . " Autoweek, Jun 2, 1997, pp. 17–18.

Bulgin, "The Future Works, Quietly", *Autoweek*, Feb. 23, 1998 pp. 12–13.

"Toyota Electric and Hybrid Vehicles", a Toyota brochure.

Nagasaka et al, "Development of the Hybrid/Battery ECU . . . ", SAE paper 981122, 1998, pp. 19–27.

*Primary Examiner*—J. J. Swann
*Assistant Examiner*—David R. Dunn
(74) *Attorney, Agent, or Firm*—Michael de Angeli

(57) ABSTRACT

A hybrid vehicle comprising an internal combustion engine controllably coupled to road wheels of the vehicle by a clutch, and having a turbocharger that is operated only when extra power is needed for a extended time, a traction motor coupled to road wheels of said vehicle, a starting motor coupled to the engine, both motors being operable as generators, a battery bank for providing electrical energy to and accepting energy from said motors, and a microprocessor for controlling these components, is operated in different modes, depending on its instantaneous torque requirements, the state of charge of the battery bank, and other operating parameters. The mode of operation is selected by the microprocessor in response to a control strategy.

15 Claims, 5 Drawing Sheets

U.S. PATENT DOCUMENTS

| | | |
|---|---|---|
| 3,525,874 A | 8/1970 | Toy |
| 3,566,717 A | 3/1971 | Berman et al. |
| 3,623,568 A | 11/1971 | Mori |
| 3,650,345 A | 3/1972 | Yardney |
| 3,732,751 A | 5/1973 | Berman et al. |
| 3,791,473 A | 2/1974 | Rosen |
| 3,837,419 A | 9/1974 | Nakamura |
| 3,874,472 A | 4/1975 | Deane |
| 3,888,325 A | 6/1975 | Reinbeck |
| 3,923,115 A | 12/1975 | Helling |
| 3,970,163 A | 7/1976 | Kinoshita |
| 4,042,056 A | 8/1977 | Horwinski |
| 4,095,664 A | 6/1978 | Bray |
| 4,148,192 A | 4/1979 | Cummings |
| 4,165,795 A | 8/1979 | Lynch et al. |
| 4,180,138 A | 12/1979 | Shea |
| 4,269,280 A | 5/1981 | Rosen |
| 4,305,254 A | 12/1981 | Kawakatsu |
| 4,306,156 A | 12/1981 | Monaco et al. |
| 4,313,080 A | 1/1982 | Park |
| 4,335,429 A | 6/1982 | Kawakatsu |
| 4,351,405 A | 9/1982 | Fields et al. |
| 4,354,144 A | 10/1982 | McCarthy |
| 4,400,997 A | 8/1983 | Fiala |
| 4,405,029 A | 9/1983 | Hunt |
| 4,407,132 A | 10/1983 | Kawakatsu |
| 4,438,342 A | 3/1984 | Kenyon |
| 4,439,989 A | 4/1984 | Yamakawa |
| 4,444,285 A | 4/1984 | Stewart et al. |
| 4,470,476 A | 9/1984 | Hunt |
| 4,495,451 A | 1/1985 | Barnard |
| 4,511,012 A | 4/1985 | Rauneker |
| 4,533,011 A | 8/1985 | Heidemeyer |
| 4,562,894 A | 1/1986 | Yang |
| 4,578,955 A | 4/1986 | Medina |
| 4,583,505 A | 4/1986 | Frank et al. |
| 4,588,040 A | 5/1986 | Albright, Jr. et al. |
| 4,593,779 A | 6/1986 | Krohling |
| 4,597,463 A | 7/1986 | Barnard |
| 4,611,466 A | 9/1986 | Keedy |
| 4,631,456 A | 12/1986 | Drescher |
| 4,680,986 A | 7/1987 | Elsner |
| 4,697,660 A | 10/1987 | Wu et al. |
| 4,765,656 A | 8/1988 | Weaver |
| 4,774,811 A * | 10/1988 | Kawamura .................. 60/608 |
| 4,815,334 A | 3/1989 | Lexen |
| 4,862,009 A | 8/1989 | King |
| 4,923,025 A | 5/1990 | Ellers |
| 4,951,769 A | 8/1990 | Kawamura |
| 4,953,646 A | 9/1990 | Kim |
| 5,053,632 A | 10/1991 | Suzuki et al. |
| 5,117,931 A | 6/1992 | Nishida |
| 5,120,282 A | 6/1992 | Fjällström |
| 5,125,469 A | 6/1992 | Scott |
| 5,172,784 A | 12/1992 | Varela, Jr. |
| 5,176,213 A | 1/1993 | Kawai et al. |
| 5,193,634 A | 3/1993 | Masut |
| 5,249,637 A | 10/1993 | Heidl et al. |
| 5,255,733 A | 10/1993 | King |
| 5,291,960 A | 3/1994 | Brandenburg et al. |
| 5,301,764 A | 4/1994 | Gardner |
| 5,318,142 A | 6/1994 | Bates et al. |
| 5,323,868 A | 6/1994 | Kawashima |
| 5,327,987 A | 7/1994 | Abdelmalek |
| 5,327,992 A | 7/1994 | Boll |
| 5,337,848 A | 8/1994 | Bader |
| 5,343,970 A | 9/1994 | Severinsky ................ 180/65.2 |
| 5,345,154 A | 9/1994 | King |
| 5,345,761 A | 9/1994 | King |
| 5,346,031 A | 9/1994 | Gardner |
| 5,350,031 A | 9/1994 | Sugiyama et al. |
| 5,372,213 A | 12/1994 | Hasebe et al. |
| 5,415,245 A | 5/1995 | Hammond |
| 5,427,196 A | 6/1995 | Yamaguchi et al. |
| 5,433,282 A | 7/1995 | Moroto et al. |
| 5,441,122 A | 8/1995 | Yoshida |
| 5,463,294 A | 10/1995 | Valdivia |
| 5,489,001 A | 2/1996 | Yang |
| 5,492,189 A | 2/1996 | Kreigler et al. |
| 5,492,190 A | 2/1996 | Yoshida |
| 5,492,192 A | 2/1996 | Brooks et al. |
| 5,495,906 A | 3/1996 | Furutani |
| 5,495,907 A | 3/1996 | Data |
| 5,495,912 A | 3/1996 | Gray, Jr. et al. |
| 5,513,718 A | 5/1996 | Suzuki et al. |
| 5,513,719 A | 5/1996 | Moroto et al. |
| 5,515,937 A | 5/1996 | Adler et al. |
| 5,545,928 A | 8/1996 | Kotani |
| 5,550,445 A | 8/1996 | Nii |
| 5,558,173 A | 9/1996 | Sherman |
| 5,558,175 A | 9/1996 | Sherman |
| 5,558,588 A | 9/1996 | Schmidt |
| 5,558,595 A | 9/1996 | Schmidt et al. |
| 5,562,565 A | 10/1996 | Moroto et al. |
| 5,566,774 A | 10/1996 | Yoshida |
| 5,568,023 A | 10/1996 | Grayer et al. |
| 5,586,613 A | 12/1996 | Ehsani |
| 5,588,498 A | 12/1996 | Kitada |
| 5,589,743 A | 12/1996 | King |
| 5,608,308 A | 3/1997 | Kiuchi et al. |
| 5,614,809 A | 3/1997 | Kiuchi et al. |
| 5,621,304 A | 4/1997 | Kiuchi et al. |
| 5,632,352 A | 5/1997 | Jenneret |
| 5,635,805 A | 6/1997 | Ibaraki et al. |
| 5,637,987 A | 6/1997 | Fattic et al. |
| 5,643,119 A | 7/1997 | Yamaguchi et al. |
| 5,644,200 A | 7/1997 | Yang |
| 5,650,713 A | 7/1997 | Takeuchi et al. |
| 5,650,931 A | 7/1997 | Nii |
| 5,653,302 A | 8/1997 | Edye et al. |
| 5,656,921 A | 8/1997 | Farrall |
| 5,664,635 A | 9/1997 | Koga et al. |
| 5,667,029 A | 9/1997 | Urban et al. |
| 5,672,920 A | 9/1997 | Donegan et al. |
| 5,697,466 A | 12/1997 | Moroto et al. ............. 180/65.2 |
| 5,704,440 A | 1/1998 | Urban et al. |
| 5,705,859 A | 1/1998 | Karg et al. |
| 5,713,425 A | 2/1998 | Buschhaus et al. |
| 5,713,426 A | 2/1998 | Okamura |
| 5,713,814 A | 2/1998 | Hara et al. |
| 5,722,911 A | 3/1998 | Ibaraki et al. |
| 5,725,064 A | 3/1998 | Ibaraki et al. |
| 5,755,303 A | 5/1998 | Yamamoto et al. |
| 5,757,151 A | 5/1998 | Donegan et al. |
| 5,767,637 A | 6/1998 | Lansberry |
| 5,773,904 A | 6/1998 | Schiebold et al. |
| 5,775,449 A | 7/1998 | Moroto et al. |
| 5,778,326 A | 7/1998 | Moroto et al. |
| 5,778,997 A | 7/1998 | Setaka et al. |
| 5,785,136 A | 7/1998 | Falkenmayer et al. |
| 5,785,137 A | 7/1998 | Reuyl |
| 5,785,138 A | 7/1998 | Yoshida |
| 5,786,640 A | 7/1998 | Sakai et al. |
| 5,788,003 A | 8/1998 | Spiers |
| 5,788,006 A | 8/1998 | Yamaguchi et al. |
| 5,788,597 A | 8/1998 | Boll et al. |
| 5,789,881 A | 8/1998 | Egami et al. |
| 5,789,882 A | 8/1998 | Ibaraki et al. |
| 5,791,426 A | 8/1998 | Yamada |
| 5,791,427 A | 8/1998 | Yamaguchi et al. |
| 5,799,744 A | 9/1998 | Yamaguchi et al. |

| | | |
|---|---|---|
| 5,806,617 A | 9/1998 | Yamaguchi et al. |
| 5,820,172 A | 10/1998 | Brigham et al. |
| 5,823,280 A | 10/1998 | Lateur .................... 180/65.2 |
| 5,823,281 A | 10/1998 | Yamaguchi et al. |
| 5,826,671 A | 10/1998 | Nakae et al. |
| 5,831,341 A | 11/1998 | Selfors et al. |
| 5,833,022 A | 11/1998 | Welke |
| 5,839,530 A | 11/1998 | Dietzel |
| 5,839,533 A | 11/1998 | Mikami et al. |
| 5,841,201 A | 11/1998 | Tabata et al. |
| 5,842,534 A | 12/1998 | Frank .................... 180/65.2 |
| 5,845,731 A | 12/1998 | Buglione et al. .......... 180/65.2 |
| 5,846,155 A | 12/1998 | Taniguchi et al. |
| 5,862,497 A | 1/1999 | Yano et al. |
| 5,865,263 A | 2/1999 | Yamaguchi et al. |
| 5,887,670 A | 3/1999 | Tabata et al. |
| 5,890,555 A | 4/1999 | Miller |
| 5,893,895 A | 4/1999 | Ibaraki |
| 5,898,282 A | 4/1999 | Drozdz et al. |
| 5,899,286 A | 5/1999 | Yamaguchi et al. |
| 5,908,077 A | 6/1999 | Moore |
| 5,927,417 A | 7/1999 | Brunner .................... 180/65.6 |
| 5,934,395 A | 8/1999 | Koide et al. |
| 5,969,624 A | 10/1999 | Sakai et al. |
| 5,986,376 A | 11/1999 | Werson |
| 5,993,351 A | 11/1999 | Deguchi et al. ............... 477/5 |
| 5,996,347 A * | 12/1999 | Nagae et al. ................. 60/602 |
| 6,018,198 A | 1/2000 | Tsuzuki et al. |
| 6,018,694 A | 1/2000 | Egami et al. ............... 701/102 |
| 6,026,921 A | 2/2000 | Aoyama .................... 180/65.2 |
| 6,048,289 A | 4/2000 | Hattori ...................... 477/15 |
| 6,053,842 A | 4/2000 | Kitada ......................... 477/5 |
| 6,054,844 A | 4/2000 | Frank |
| 6,059,059 A | 5/2000 | Schmidt-Brucken |
| 6,098,733 A * | 8/2000 | Ibaraki et al. ............. 180/65.2 |
| 6,109,025 A * | 8/2000 | Murata et al. ................ 60/297 |
| 6,131,538 A * | 10/2000 | Kanai ........................... 123/2 |
| 6,161,384 A * | 12/2000 | Reinbold et al. ............. 60/602 |
| 6,209,672 B1 * | 4/2001 | Severinsky ................ 180/65.2 |

\* cited by examiner

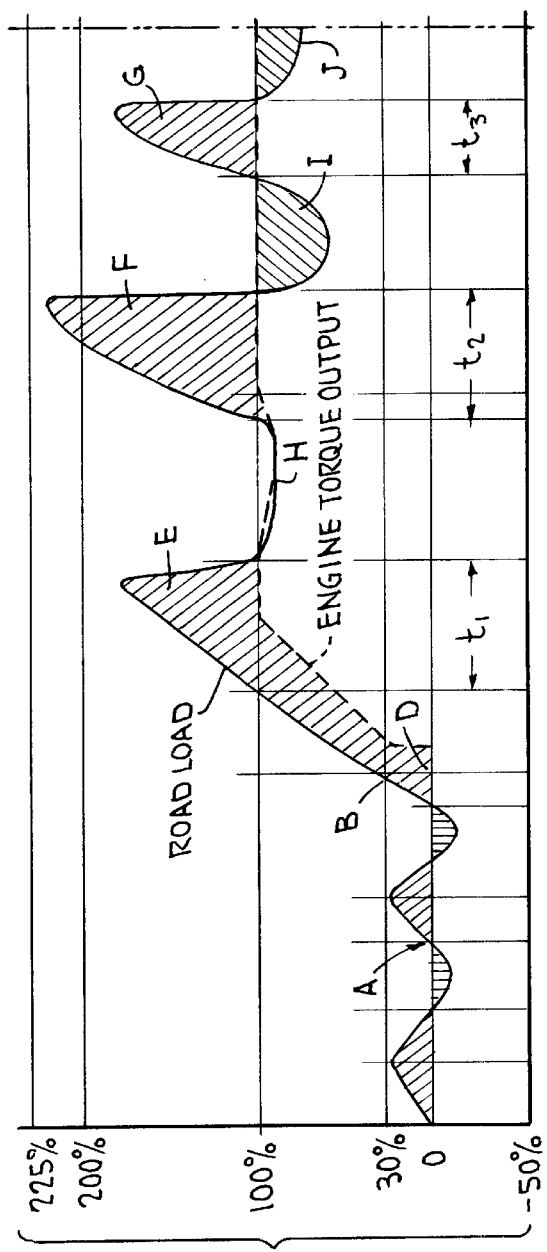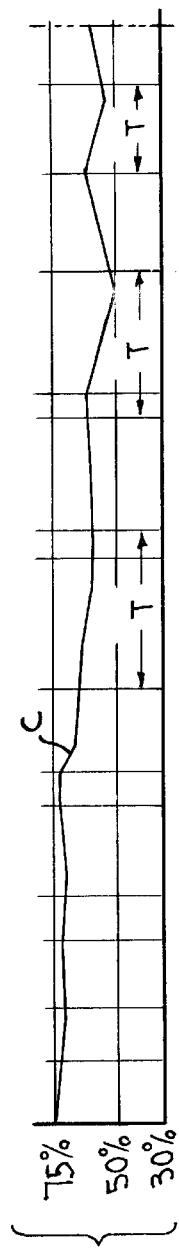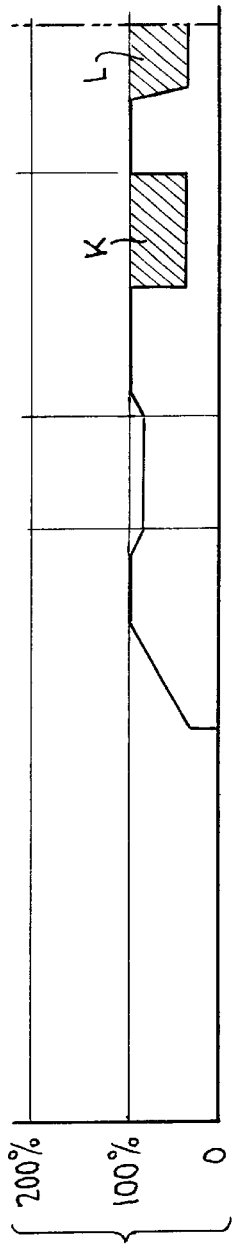
FIG. 4(a) ROAD LOAD AS % OF ENGINE'S MAX. TORQUE (NORMALLY ASPIRATED)
FIG. 4(b) BATTERY STATE OF CHARGE
FIG. 4(c) ENGINE + TURBO-CHARGER OPERATION

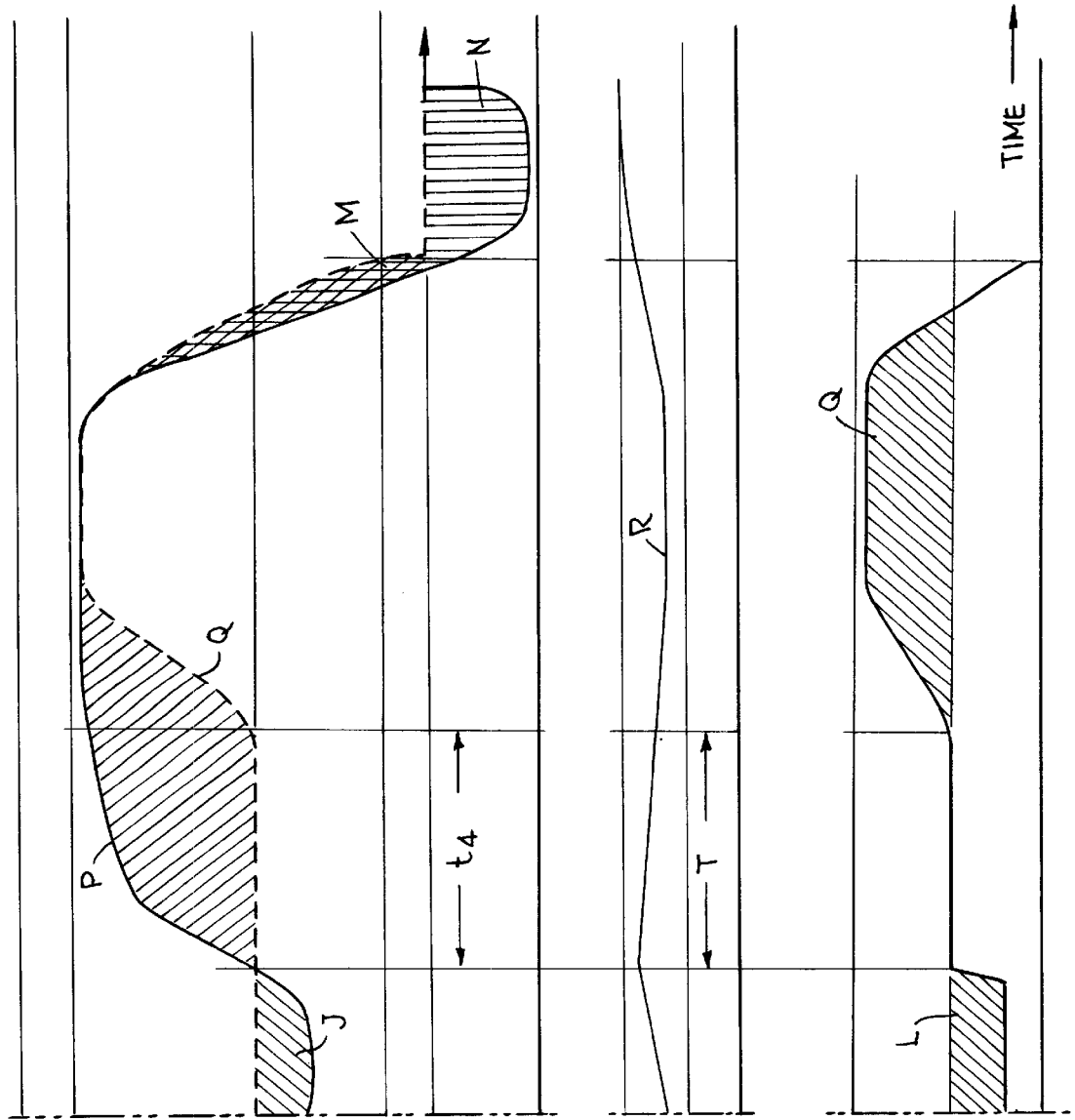

HYBRID VEHICLES INCORPORATING TURBOCHARGERS

CROSS-REFERENCE TO RELATED APPLICATIONS

This application claims priority from Provisional Application Ser. No. 60/122,296, filed Mar. 1, 1999.

FIELD OF THE INVENTION

This application relates to improvements in hybrid vehicles, that is, vehicles in which both an internal combustion engine and one or more electric motors are provided to supply torque to the driving wheels of the vehicle, and wherein turbocharging is employed under certain circumstances. A preferred method of sizing the power-producing components of the hybrid vehicle is also disclosed.

BACKGROUND OF THE INVENTION

This application discloses a number of improvements over and enhancements to the hybrid vehicles disclosed in U.S. Pat. No. 5,343,970 (the "'970 patent") to one of the present inventors, which is incorporated herein by this reference. Where differences are not mentioned, it is to be understood that the specifics of the vehicle design shown in the '970 patent are applicable to the vehicles shown herein as well. Discussion of the '970 patent herein is not to be construed to limit the scope of its claims.

Generally speaking, the '970 patent discloses hybrid vehicles wherein a controllable torque transfer unit is provided capable of transferring torque between an internal combustion engine, an electric motor, and the drive wheels of the vehicle. The direction of torque transfer is controlled by a microprocessor responsive to the mode of operation of the vehicle, to provide highly efficient operation over a wide variety of operating conditions, and while providing good performance.

The flow of energy—either electrical energy stored in a substantial battery bank, or chemical energy stored as combustible fuel—is similarly controlled by the microprocessor. For example, in low-speed city driving, the electric motor provides all torque needed responsive to energy flowing from the battery. In high-speed highway driving, where the internal-combustion engine can be operated efficiently, it typically provides all torque; additional torque may be provided by the electric motor as needed for acceleration, hill-climbing, or passing. The electric motor is also used to start the internal-combustion engine, and can be operated as a generator by appropriate connection of its windings by a solid-state, microprocessor-controlled inverter. For example, when the state of charge of the battery bank is relatively depleted, e.g., after a lengthy period of battery-only operation in city traffic, the internal combustion engine is started and drives the motor at between 50 and 100% of its maximum torque output, for efficient charging of the battery bank. Similarly, during braking or hill descent, the kinetic energy of the vehicle can be turned into stored electrical energy by regenerative braking.

The hybrid drive train shown in the '970 patent has many advantages with respect to the prior art which are retained by the present invention. For example, the electric drive motor is selected to be of relatively high power, specifically, equal to or greater than that of the internal combustion engine, and to have high torque output characteristics at low speeds; this allows the conventional multi-speed vehicle transmission to be eliminated. As compared to the prior art, the battery bank, motor/generator, and associated power circuitry are operated at relatively high voltage and relatively low current, reducing losses due to resistive heating and simplifying component selection and connection.

Application Ser. No. 09/264,817 filed Mar. 9, 1999 (the "'817 application"), now U.S. Pat. No. 6,209,672, also incorporated herein by reference, discloses and claims certain further improvements in hybrid vehicles, described below, with respect to the vehicles of the '970 patent. The present patent application represents further improvements over the hybrid vehicle described in the '817 application.

OBJECTS OF THE INVENTION

It is an object of the present invention to provide further improvements over the hybrid vehicles shown in the '970 patent and the '817 application.

It is a more specific object of the present invention to provide a hybrid drive system for vehicles that does not require the controllable torque-transfer unit shown in the '970 patent, while providing the functional advantages of the hybrid vehicles shown in the '970 patent and the '817 application, together with further improvements.

Other aspects of and improvements provided by the present invention will appear below.

SUMMARY OF THE INVENTION

According to the invention of the '817 application, the controllable torque-transfer unit shown in the '970 patent is eliminated by replacing the single electric motor shown therein by two separate motors, both operable as generators when appropriate, connected by a functionally-conventional clutch or mechanical interlock operated by the microprocessor responsive to the vehicle's mode of operation and to input commands provided by the operator of the vehicle. As in the '970 patent, an internal combustion engine is provided, sized to provide sufficient torque for the maximum cruising speed desired without requiring a multi-speed transmission, and is used for battery charging as needed. According to the invention of the '817 application, a relatively high-powered "traction" motor is connected directly to the output shaft of the vehicle; the traction motor provides torque to propel the vehicle in low-speed situations, and provides additional torque when required, e.g., for acceleration, passing, or hill-climbing during high-speed driving. A relatively low-powered starting motor is also provided, and can be used to provide torque propelling the vehicle when needed. This second motor is connected directly to the internal combustion engine for starting the engine. Unlike a conventional starter motor, which rotates an internal combustion engine at low speed (60–100 rpm) for starting, necessitating provision of a rich fuel/air mixture for starting, the starter motor according to the invention spins the engine at relatively high speed (typically 300 rpm) for starting; this allows starting the engine with a near-stoichiometric mixture, significantly reducing undesirable emissions and improving fuel economy at start-up.

As noted, the two motors are separated by a functionally-conventional clutch, that is, a clutch which either joins the two motors together for rotation at the same speed, or separates them completely. As the motor shafts can be controlled to rotate at essentially the same speed when the clutch is engaged, the clutch need not allow for significant slipping before engagement. Accordingly, a friction clutch, as normally provided for road vehicles, may not be required, and a less-expensive simple mechanical interlock may alternatively be employed. Engagement of the clutch is controlled by the microprocessor, e.g., controlling a hydraulic actuator, responsive to the state of operation of the vehicle and the current operator input.

For example, during low-speed operation, the clutch will be disengaged, so that the traction motor is disconnected from the engine; the vehicle is then operated as a simple electric car, i.e., power is drawn from the battery bank and supplied to the traction motor. If the batteries become depleted, the starter motor is used to start the internal combustion engine, which then runs at relatively high torque output (e.g., between about 50–100% of its maximum torque), for efficient use of fuel, and the starting motor is operated as a high-output generator to recharge the battery bank. If the operator calls for more power than available from the traction motor alone, e.g., in accelerating onto a highway, the starter motor starts the internal combustion engine, and the clutch is engaged, so that the engine and starter motor can provide additional torque. The engine is sized so that it provides sufficient power to maintain a suitable highway cruising speed while being operated in a torque range providing good fuel efficiency; if additional power is then needed, e.g., for hill-climbing or passing, the traction and/or starter motors can be engaged as needed. Both motors can be operated as generators, e.g., to transform the vehicle's kinetic energy ito electrical power during descent or deceleration.

It is also within the scope of the invention to provide power from the engine and starting motor to one pair of road wheels, through the clutch, and from the traction motor to another set of wheels; this provides all-wheel drive, when needed, without a transfer gearbox or drive shaft. See provisional patent application Ser. No. 60/122,478, filed Mar. 1, 1999, incorporated by reference herein. In a further embodiment, torque from the engine, starter motor, and a first traction motor can be provided to a first set of road wheels, and torque from a second traction motor to a second set of road wheels; this would provide maximal flexibility in control of the transfer of torque to the road, useful in low-traction conditions.

In each of these aspects of the operation of the vehicle, and as in the '970 patent, the operator of the vehicle need not consider the hybrid nature of the vehicle during its operation, but simply provides control inputs by operation of the accelerator and brake pedals. The microprocessor determines the proper state of operation of the vehicle based on these and other inputs and controls the various components of the hybrid drive train accordingly.

According to the present invention, the engine is further provided with a turbocharger, also controlled by the microprocessor, and operated only under extended high-load conditions. In low-speed driving, the turbocharger is bypassed and is inactive, so that the vehicle is operated as in the '817 application; similarly, when the torque provided by the engine is inadequate for short-term high loads, such as during overtaking on the highway, the traction motor is employed to propel the vehicle. The starting motor may also be employed to provide torque as needed. However, according to the present invention, when conditions demand production of high torque for extended periods, for example, when towing a trailer, climbing a long hill, or driving at sustained high speed, or when the battery bank is relatively discharged, the microprocessor activates the turbocharger, so that additional torque is produced by the internal combustion engine when needed.

More specifically, in the '817 application, during substantially steady-state operation, e.g., during highway cruising, the control system operates the engine at varying torque output levels, responsive to the operator's commands. The range of permissible engine torque output levels is constrained to the range in which the engine provides good fuel efficiency. Where the vehicle's torque requirements exceed the engine's maximum efficient torque output, e.g., during passing or hill-climbing, one or both of the electric motors are energized to provide additional torque; where the vehicle's torque requirements are less than the minimum torque efficiently provided by the engine, e.g., during coasting, on downhills or during braking, the excess engine torque is used to charge the batteries. Regenerative charging may be performed simultaneously, as torque from the engine and the vehicle's kinetic energy both drive either or both motors in generator mode. The rate of change of torque output by the engine may be controlled in accordance with the batteries' state of charge.

According to the present invention, the above control strategy is retained and employed under substantially all "normal" driving conditions; addition of a turbocharger controlled by the microprocessor according to the invention allows additional control flexibility. More specifically, when conditions demand power in excess of the engine's normally-aspirated maximum output for a relatively long period of time, e.g., for climbing long hills, for towing, or when driving at high speed, the turbocharger, which is normally bypassed and thus inactive, is energized by supply of the engine's exhaust gas stream. The engine then produces additional torque as required.

As compared to turbochargers as conventionally employed, which are constantly active, the turbocharger according to the present invention is used only when needed, that is, as noted, only when torque in excess of that available from the engine when in "normally-aspirated" mode is required. This allows both the engine and turbocharger to be designed to meet relatively well-defined objectives, providing further efficiency in use of fuel. Furthermore, because according to the invention the turbocharger is employed in a hybrid vehicle having one or more electric motors available to provide additional torque substantially immediately upon demand, the vehicle overall does not exhibit the slow response time of conventional turbocharged vehicles.

In a further refinement, the amount of time during which the motors will be used to supply torque in excess of that available from the engine in normally-aspirated mode before the turbocharger is activated is controlled responsive to the state of charge of the vehicle battery bank. More specifically, in general, when power in excess of the engine's normally-aspirated capacity is required for a shorter period of time, e.g., when passing, at least the traction motor, or both of the electric motors, are energized by power from the battery. However, it is also within the scope of the invention to employ the turbocharger under circumstances calling for maximum acceleration, or when the state of charge of the battery is such that the electric motors will not be adequate to supply the torque required.

In addition to the operational advantages noted, provision of an engine having a "turbocharger-on-demand" in a hybrid vehicle allows the engine to be smaller than otherwise, that is, to provide adequate highway performance in a vehicle of a given weight. As the starting motor/generator must be sized such that when it is driven by the engine to charge the batteries (e.g., in extended city driving) the engine is loaded adequately to be operated efficiently, employment of a smaller engine allows use of a smaller starting motor/generator. For similar reasons, provision of a smaller engine allows it to be used to efficiently propel the vehicle in highway driving commencing at lower average speeds, resulting in turn in better fuel economy.

BRIEF DESCRIPTION OF THE DRAWINGS

The invention will be better understood if reference is made to the accompanying drawings, in which:

FIG. 4 is a timing diagram showing road load, engine torque output, the state of charge of the battery bank, and engine operation in normally-aspirated and turbocharged modes of operation as functions of time, thus illustrating a typical control strategy employed during low-speed city driving, highway cruising, and extended high-load driving.

DESCRIPTION OF THE PREFERRED EMBODIMENTS

As indicated above, this application discloses certain modifications, improvements, and enhancements of the hybrid vehicles shown in U.S. Pat. No. 5,343,970 (the "'970 patent") to one of the present inventors, which is incorporated herein by this reference; where not otherwise stated, the design of the vehicle of the present invention is similar to that shown in the '970 patent. Components commonly numbered in this application and the '970 patent are functionally similar in the corresponding systems, with detail differences as noted. The advantages of the system shown in the '970 patent with respect to the prior art are provided by that of the present invention, with further improvements provided by the latter, as detailed herein. The present application also represents further improvements over the hybrid vehicle described in Application Ser. No. 09/264,817 filed Mar. 9, 1999 (the "'817 application"), also incorporated herein by reference.

Figure 1:
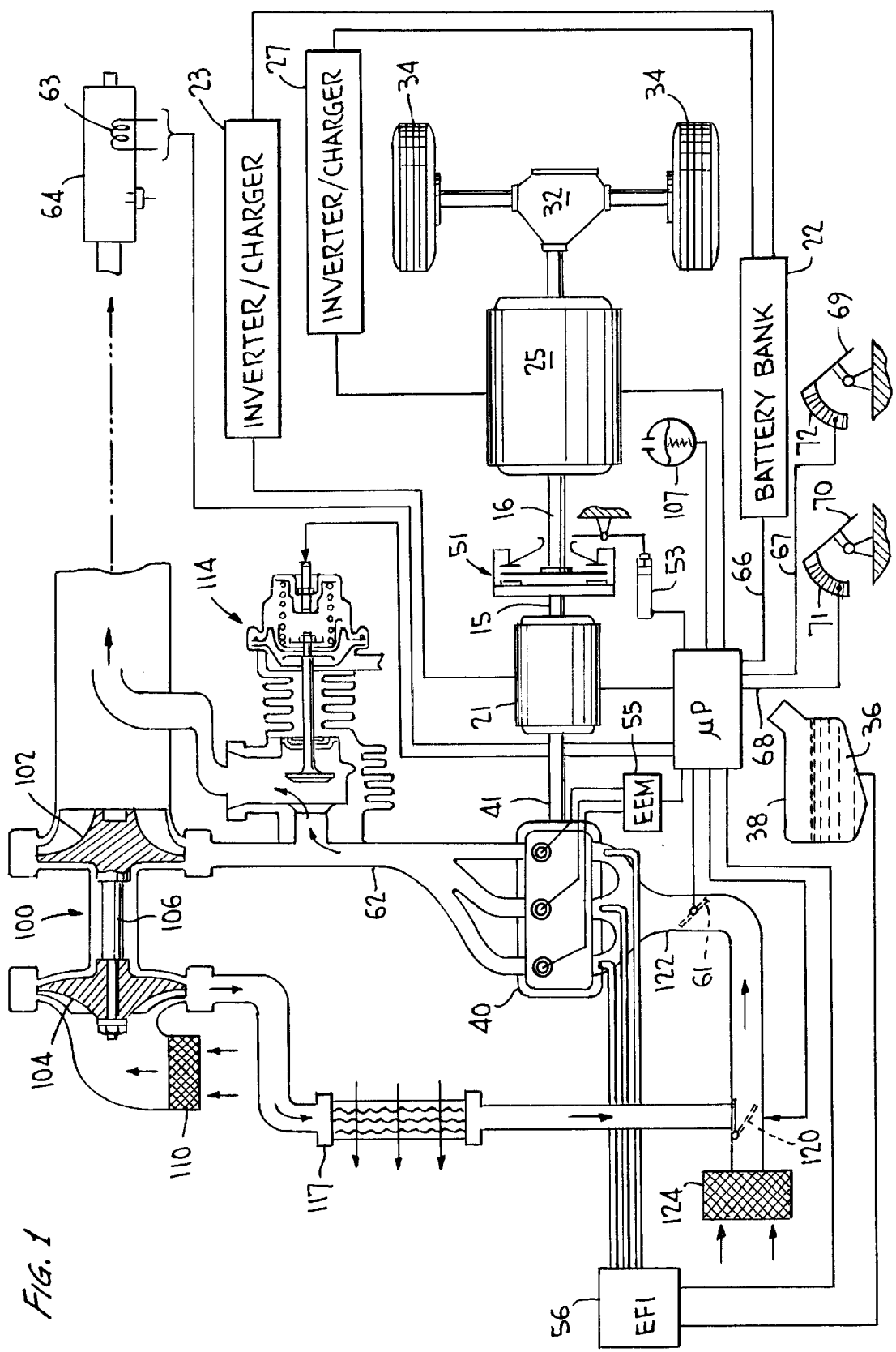
FIG. 1 shows a schematic diagram of the principal components of the hybrid vehicle drive system according to the invention.
Figure 2:
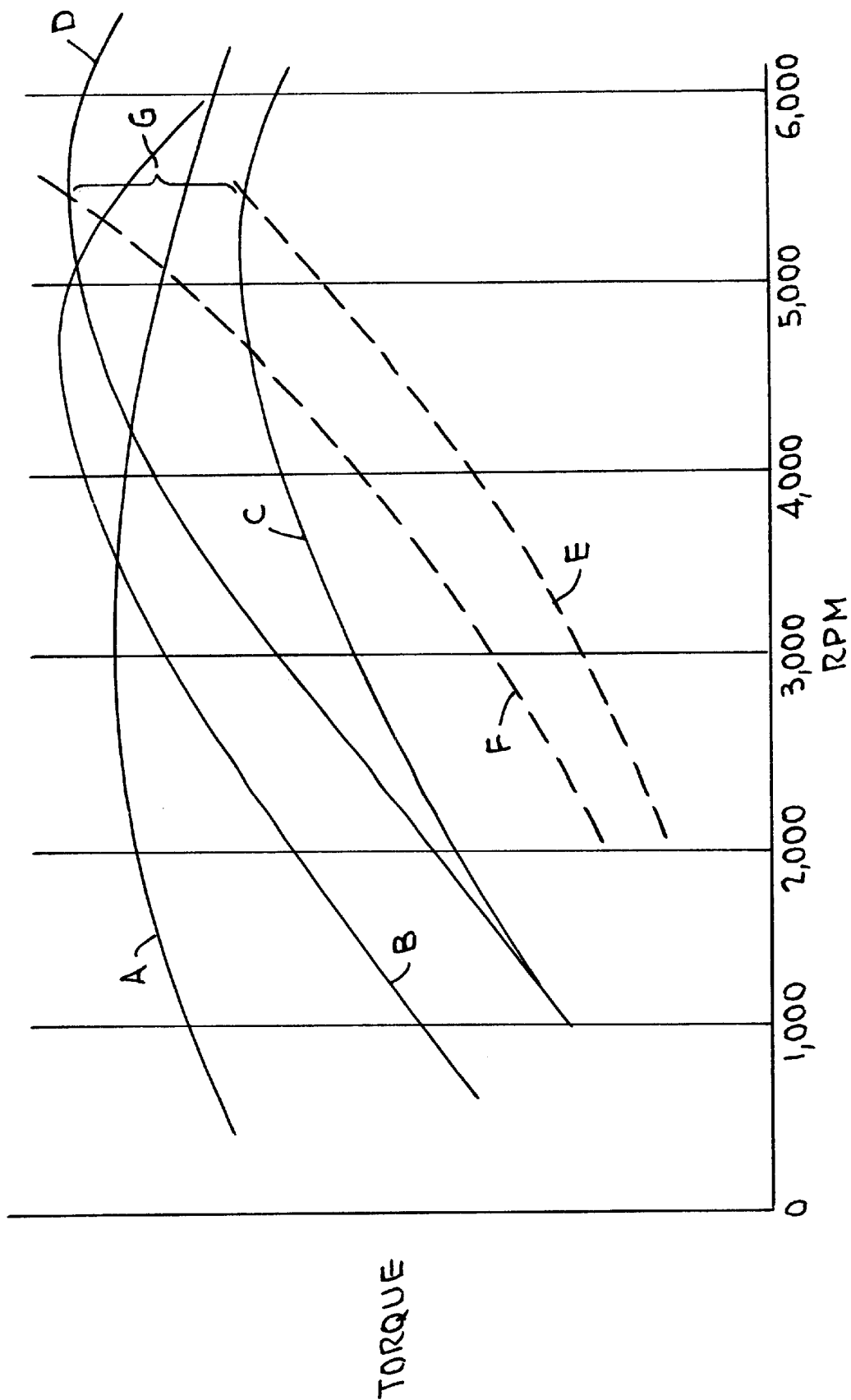
FIG. 2 is a diagram in which engine torque is plotted against engine speed for a typical engine in normally-aspirated and turbocharged modes of operation, and also shows typical road loads encountered.

As shown in the '970 patent with reference to FIGS. 1 and 2 thereof, typical modern automobiles operate at very low efficiency, due principally to the fact that internal combustion engines are very inefficient except when operating at near peak torque output; this condition is only rarely met. (The same is true, to greater or lesser degree, of other road vehicles powered by internal combustion engines.) According to an important aspect of the invention of the '970 patent, substantially improved efficiency is afforded by operating the internal combustion engine only at relatively high torque output levels, typically at least 35% and preferably at least 50% of peak torque. When the vehicle operating conditions require torque of this approximate magnitude, the engine is used to propel the vehicle; when less torque is required, an electric motor powered by electrical energy stored in a substantial battery bank drives the vehicle; when more power is required than provided by either the engine or the motor, both are operated simultaneously. The same advantages are provided by the system of the present invention, with further improvements and enhancements described in detail below.

In the system of the '970 patent, torque from either or both the engine and motor is transferred to the drive wheels of the vehicle by a controllable torque-transfer unit. This unit also allows torque to be transferred between the motor and engine, for starting the engine, and between the wheels and motor, for regenerative battery charging during deceleration of the vehicle. This unit, while entirely practical, comprises gears for power transfer, which are inevitably a source of audible noise and frictional losses. According to the invention of the '817 application, and the present invention, the controllable torque-transfer unit is eliminated. Instead, two electric motors are provided, each separately controlled by a microprocessor controller responsive to operator commands and sensed operating conditions.

As shown in FIG. 1 of the present application, and as also shown in the '817 application, a traction motor 25 is connected directly to the vehicle differential 32, and thence to the road wheels 34. A starting motor 21 is connected directly to the internal combustion engine 40. The motors 21 and 25 are functional as motors or generators by appropriate operation of corresponding inverter/charger units 23 and 27, respectively. The two motors are controllably connected for torque transfer by a clutch 51, conventional in the sense that it is either engaged, wherein the shafts of motors 21 and 25 are connected and rotate together, or disengaged, wherein the shafts may rotate separately. (The respective positions of motor 21 and engine 40 with respect to clutch 51 could be reversed as compared to their positions in FIGS. 1 and 2 without affecting the function of the system, although as engine 40 would then require torque transmitting connection at both ends of its crankshaft, some additional complexity would result.) The clutch 51 is operated by microprocessor 48, e.g., through a known hydraulic actuator 53, together with the other components of the system, in accordance with the operational state of the vehicle and the operator's input commands.

As in the case of the hybrid vehicle system shown in the '970 patent, and as indicated above, the vehicle of the invention is operated in different modes depending on the torque required, the state of charge of the batteries, and other variables. For example, during low-speed operation, such as in city traffic, the vehicle is operated as a simple electric car, where all power is provided to road wheels 34 by traction motor 25; engine 40 is run only as needed to charge battery bank 22. (In this connection, essentially conventional lead-acid batteries are currently preferred for battery bank 22, since the infrastructure to provide and dispose of these batteries is already in place; that is, lead-acid batteries are widely available, readily recycled, and so on. More advanced batteries may be used if and when they become widely available and economically competitive.) Under these circumstances, the charging current is provided by starting motor 21, operated as a generator by appropriate operation of inverter/charger 23. Accordingly, clutch 51 is disengaged, so that the road speed of the vehicle is independent of the speed of engine 40; engine 40 can thus be operated at high torque, for fuel efficiency. The operating modes of the vehicle of the invention are further discussed below.

As shown in further detail in the '817 application, the microprocessor 48 is provided with signals indicative of the rotational speeds of shafts 15 and 16, and controls operation of engine 40, motor 21, and motor 25 as necessary to ensure that the shafts are rotating at substantially the same speed before engaging clutch 51; therefore, clutch 51 need not necessarily be an ordinary automotive friction clutch (as illustrated schematically in FIG. 1), provided to allow extensive relative slipping before the shafts are fully engaged. More particularly, as slipping of the clutch is not required to propel the vehicle initially from rest, as is the case in conventional vehicles, clutch 51 need not allow for extensive slipping when being engaged; in some cases it may be satisfactory to provide clutch 51 as a simple self-aligning mechanical interlock, wherein positive mechanical connection is made between the shafts 15 and 16 upon engagement. Such a mechanical interlock is simpler and less expensive than a friction clutch. However, it is within the scope of the invention to provide a friction clutch.

Additional signals input to microprocessor 48 include signals indicative of the state of charge of the battery bank 22, and operator input commands, typically acceleration, direction, and deceleration commands. The operator input commands may be provided to microprocessor 48 by position-sensing encoders 71 and 72 providing signals to microprocessor 48 over lines 67 and 68 upon motion of accelerator and brake pedals 69 and 70 (FIG. 1) respectively. The microprocessor monitors the rate at which the operator depresses pedals 69 and 70 as well as the degree to which pedals 69 and 70 are depressed. The microprocessor uses this information, and additional information to make decisions concerning the proper operation of the vehicle according to the invention.

For example, suppose the vehicle has been operated in city traffic for some time, that is, under battery power only. Typically the operator will only depress the accelerator slightly to drive in traffic. If the operator then depresses accelerator pedal 69 significantly farther than he or she had, for example, the prior few times acceleration was required, this may be taken as an indication that more torque will be required, and so starting motor 21 will be used to start engine 40. If the operator does not depress pedal 69 rapidly, a heater 63 will be used to preheat a catalytic converter 64 provided in the engine exhaust system 62, so that any fuel that is not combusted during starting of the engine 40 will be catalytically combusted; however, if the operator depresses the pedal 69 rapidly, indicating an immediate need for full acceleration, the traction and starting motors may be driven beyond their normal rated power briefly, so that adequate power is provided (as may be necessary for safe operation) while the catalytic converter is heated. Copending provisional application Ser. No. 60/122,477 filed Mar. 1, 1999, incorporated herein by reference, provides full details of the preheating of the catalytic converter.

Similarly, if the operator depresses the brake pedal 70 relatively gently, all braking may be provided by regenerative charging of the batteries; if the operator instead presses rapidly on brake pedal 70, both mechanical and regenerative braking will be provided. Mechanical braking is also provided on long downhills when the batteries are fully charged.

In addition to engine and starting motor speed and traction motor speed, battery voltage, battery charge level, and ambient temperature are also either monitored directly or derived from monitored variables. In response to these inputs, and the operator inputs, microprocessor controller 48 operates a control program and provides output control signals to engine 40, by commands provided to its electronic fuel injection unit (EFI) 56 and electronic engine management system (EEM) 55, and to starting motor 21, clutch 51, traction motor 25, inverter/charger units 23 and 27, and other components. As indicated, the control signals provided to inverter/chargers 23 and 27 allow control of the current to be provided, of direction of rotation of the motor 25, allowing reversing of the vehicle, as well as control of operation of the motors 21 and 25 in motor or generator mode. Inverter/chargers 23 and 27 are separately controlled to allow independent operation of motors 21 and 25. See the '817 application for further details.

Other elements of the system as illustrated in FIG. 1 are generally as discussed in the '970 patent and '817 application, including supply of fuel 36 from tank 38, air filter 124, and throttle 61.

As in the '970 patent, engine 40 is sized so that its full torque output is adequate to drive the vehicle in a desired range of cruising speeds, so that the engine is operated at high efficiency during highway cruising. During highway cruising, therefore, clutch 51 is engaged; engine 40 then drives road wheels 34 through the shafts of motors 21 and 25. If extra power is needed, e.g., for acceleration or hill-climbing, either or both of motors 21 and 25 can be powered. Similarly, under deceleration, either or both of motors 21 and 25 are operated as generators, proving regenerative recharging of battery bank 22.

According to the '817 application, when the microprocessor controller 48 detects an operator requirement for additional power, such as during transition from slow-speed to highway operation, or by measuring the rate at which the operator depresses accelerator pedal 70, engine 40 is started using starter motor 21 and brought up to speed before clutch 51 is engaged, to ensure a smooth transition. As cruising speed is reached, power to traction motor 25 (and to starter motor 21, if also used to accelerate the vehicle) is gradually reduced. Provision of the clutch 51 and separate starter motor 21, as compared to using the single traction motor to start engine 40 while simultaneously accelerating the vehicle, as in the '970 patent, provides much simpler operation.

Provision of the clutch 51 and separate starter motor 21 also allows another important improvement to be provided according to the '817 application, namely starting engine 40 at high speed, e.g., at least about 300 rpm, as compared to the 60–100 rpm starts conventionally provided. High-rpm starting allows significant reduction of the usual necessity of providing a fuel-rich fuel:air mixture to start engine 40, reducing emission of unburned fuel and improving fuel economy at start-up. More specifically, in conventional low-rpm starts, an extremely rich mixture must be provided to ensure that some fraction of the fuel is in the vapor phase; only fuel in the vapor phase can be ignited by a spark. At high starting speeds, turbulence in the combustion chamber is sufficient to ensure the presence of vapor, particularly if the fuel is atomized by high-pressure fuel injection, as is preferred, so that a near-stoichiometric mixture can be provided to engine 40 during the starting phase. As noted, the avoidance of rich mixtures at starting significantly reduces emission of unburned fuel—since most of the fuel provided to a conventional engine at starting is immediately exhausted unburnt—and provides some improvement in fuel efficiency. Further reduction in emissions are discussed in the '817 application, and copending provisional application Ser. No. 60/122,477 filed Mar. 1, 1999.

Accordingly, the primary considerations in selecting the torque of starting motor 21 is that it be capable of rotating the engine 40 at about 300 rpm for starting, and that it be capable of accepting at least about 30% of the engine's maximum torque output when operated as a generator, so that the engine can be efficiently employed when charging the battery bank during extended low-speed vehicle operation; the main consideration in specification of the torque of engine 40 is that it provide sufficient power for highway cruising while being operated at high efficiency, i.e., that its maximum power output be approximately equal to that required to maintain a range of desired cruising speeds; and the principal consideration defining the power required of the traction motor 25 is that it be sufficiently powerful to provide adequate acceleration in combination with the engine 40 and starting motor 21. Stated differently, the total power available provided by all of these torque-producing components should be at least equal to and preferably exceeds the peak power provided by the internal combustion engines of conventional vehicles of similar intended use, both as measured at the wheels. Moreover, as set forth in the '970 patent, the total torque provided by motors 21 and 25 should be at least equal to that produced by engine 40; this is important is achieving adequate low-speed performance in a vehicle not including a variable-ratio transmission.

At the same time, motors 21 and 25 are also sized to be capable of recovering 65–90% of the vehicle's kinetic energy when operated as generators in the regenerative braking mode. A particularly high fraction of the vehicle's kinetic energy can be recovered during low-speed operation; as compared to high-speed operation, where air resistance and road friction consume a relatively large fraction of the total energy required, in low speed operation much energy is lost by conventional vehicles as heat released during braking.

As also set forth in the '970 patent, the vehicle's electrical system operates at higher voltage than conventional electric and hybrid vehicles, e.g., 800–1200 V as compared to 240 V; this approximate three-fold increase in the operating voltage provides a concomitant reduction in the current that flows in the various modes of operation of the vehicle, to one-third the current that would flow for the same amount of power transfer in a low-voltage system. Reducing the current has many advantages. For example, the batteries are relatively heavily loaded when powering the traction motor to provide torque; operating the vehicle at high voltage, so that the current is reduced to one-third of the conventional value, substantially extends battery life. Similarly, the amount of current supplied to the batteries during charging using starter motor 21 or regenerative braking is reduced to one-third the conventional value; this allows recovery of substantially all the vehicle's kinetic energy as battery charge (i.e., in a lower-voltage, higher-current embodiment, more power would be lost to resistance heating), and also greatly extends battery life, as battery life is adversely affected by charging at high current. Recalling that an important aspect of the invention is to allow the engine to be substantially loaded during the charging operation, so that it is run at high efficiency, and noting that this means the minimum power output of the starter motor when operated as a generator is therefore relatively high, on the order of 30–40 KW, it will be appreciated that operating at high voltage and low current is extremely significant to achieving the goals of efficient use of fuel and long battery life.

Given the above considerations, the following are typical power specifications for the engine 40, starting motor 21 and traction motor 25 of a 3000 pound vehicle having performance approximately equivalent to that of a "mid-size" sedan of United States manufacture; it should be understood that in these specifications, reference is made to rated peak power of the various components, that is, the components are rated at the combination of torque and rpm yielding the maximum torque produced per unit time.

Engine 40: 40 to 50 horsepower at 6000 rpm Starting motor 21: 10–15 horsepower at approximately 1500 rpm and higher speeds.

Traction motor 25: 50–60 horsepower from 1500 to 6000 rpm.

The same starting motor would be satisfactory for a larger, 4000 pound sedan, but the engine would typically provide 70–90 horsepower at 6000 rpm and the traction motor 75–100 horsepower.

In both cases, the total rated power available from the electric motors should equal, and preferably exceeds, the maximum power available from the engine.

These components would provide acceleration much superior to that of typical similarly-sized automobiles of United States manufacture. It will be apparent that these specifications may vary over relatively wide ranges depending on the intended use of the vehicle of the invention, and should not be construed to limit the scope of the invention.

As indicated above, in the preferred embodiment, both the starting and traction motors are AC induction motors, although other types may also be employed. These motors, and the inverter/chargers driving them, should be chosen and operated such that the motors have torque output characteristics varying as a function of rpm as illustrated in FIG. 14 of the '970 patent; that is, the motors should produce substantially constant torque up to a base speed, typically 1500–2000 rpm, and should produce substantially constant power at higher speeds. The ratio of the base to maximum speed can vary between about 3 to 1 and about 6 to 1. By comparison, the series-wound DC motors conventionally used as engine starter motors provide very high torque, but only at very low speeds; their torque output drops precipitously at higher speeds. Such conventional starter motors would be unsatisfactory in the present system.

As noted, each of the torque-producing components (that is, engine 40 and starting and traction motors 21 and 25) may operate at the same speed, so that no gear-reduction units or similar heavy and power-dissipating intermediate components are needed. A maximum speed of approximately 6000 rpm is preferred, as this represents a good compromise between cost, weight, and size of the key components. However, it is within the scope of the invention to operate the starter motor, traction motor, and engine at differing rotational speeds, and connect these torque-producing components to one another and to the road wheels by fixed-ratio chain, gear, or belt drives. More specifically, it is presently preferred to provide the starter motor 21 as a "faceplate" or "pancake" motor, effectively forming the flywheel of the engine, so that the starter motor rotates at the same speed as the engine, and provide the traction motor as a separate unit, operating at much higher speed, and connected to the driveshaft through a chain reduction drive. This allows the traction motor to be relatively smaller.

It is also within the scope of the invention to drive one set of wheels with the traction motor alone, and drive a second set with the combination of the engine and starting motor; see copending application Ser. No. 09/822,866 filed Apr. 2, 2001 for further details. Another option that is within the scope of the invention is to direct torque from the engine, starter motor, and a first traction motor to a first set of road wheels, and torque from a second traction motor to a second set of road wheels; this would provide maximal flexibility in control of the transfer of torque to the road, useful in low-traction conditions.

In each case, no variable speed transmission between the torque-producing components and the road wheels is provided. The speed of rotation of the torque-producing components can be reduced to a suitable speed for the road wheels by chain, gear, or belt drive reduction, which might conveniently be incorporated with differential 32; the reduction ratio can be chosen to provide substantially any desired top speed.

As indicated above, during highway cruising, where the torque required to propel the vehicle varies as indicated by the operator's commands, the control system operates the engine at correspondingly varying torque output levels. The range of permissible engine torque output levels is constrained to the range in which the engine provides good fuel efficiency. According to the '817 application, where the vehicle's torque requirements exceed the engine's maximum efficient torque output, e.g., during passing or hill-climbing, one or both of the electric motors are energized to provide additional torque; where the vehicle's torque requirements are less than the torque then being produced by the engine, e.g., during coasting, on downhills, or during braking, the excess engine torque is used to charge the batteries. Regenerative charging may occur simultaneously, as torque from the engine and the vehicle's kinetic energy both drive one or both motors operated in generator mode. The rate of change of torque output by the engine may be controlled to reduce emissions, and in accordance with the state of charge of the battery bank.

According to the present invention, further flexibility is provided to the hybrid vehicle drive of the '817 application by providing a turbocharger 100, also controlled by the microprocessor 48, so as to be operated when useful in further improving vehicle efficiency and drivability and not at other times. Essentially, the turbocharger 100 is employed only when the vehicle's torque requirements, or "road load", exceeds the engine's maximum torque for a relatively extended period T of time, for example, during extended high-speed driving, towing a trailer, or driving up a long hill. Where the road load exceeds the engine's maximum torque for a relatively short period less than T, the traction motor (and possibly also the starting motor) are used to provide additional torque, as in the '970 patent and the '817 application. According to a further aspect of the invention, the period T is controlled in response to the state of charge of the battery bank; when the battery bank is relatively depleted, the turbocharger is activated sooner than otherwise, so as to preserve the battery bank. However, when the battery bank is relatively fully charged, it is used to supply the additional torque needed in preference to the turbocharger.

As is well known to those of skill in the art, a turbocharger 100 typically comprises two turbine wheels 102 and 104 on a common shaft 106, referred to herein as the exhaust-side and air-side wheels respectively. The flow of exhaust gas from engine 40 causes exhaust-side wheel 102 to spin; air-side wheel 104 is driven by shaft 106, drawing air into the body of turbocharger 100 through air filter 110. Waste heat in the exhaust stream is thus effectively recovered by compressing the intake air, which is then ducted to the intake manifold of engine 40. Additional fuel can be burned in the additional air thus provided, so that additional torque is produced. The compressed air may be cooled adiabatically by heat exchange with ambient air in intercooler 112 if desired, further improving thermal efficiency of engine 40.

In typical turbocharger operation, a "wastegate" 114 is provided to limit the exhaust pressure incident on exhaust-side wheel 102, thus limiting the speed of air-side wheel 104 and regulating the "boost" provided by the turbocharger. The waste gate may be spring loaded to open at a fixed boost pressure (as typically provided to regulate the output of turbocharged racing engines) or may be controlled in a feedback loop using the pressure in the engine intake manifold as the control variable. See *Automotive Handbook*, *2nd Ed.*, Robert Bosch GmbH (1986), p. 356.

Further, in conventional practice, the turbocharger is used at all times, and the engine's design is optimized accordingly. For example, turbocharged gasoline engines typically have compression ratios of 7 or 8 to 1, as compared to 9–11 to 1 for normally-aspirated engines. Neither practice is employed according to the present invention; the turbocharger is controlled by the microprocessor to operate only when needed, and the engine's compression ratio is selected based on design criteria relevant when operated in the normally-aspirated mode.

For an engine of given displacement, turbocharging as usually implemented provides relatively high torque at the upper end of the engine's speed range, but relatively poor torque at lower speeds; moreover, turbocharged engines typically suffer "turbo lag", that is, slow response to sudden increase in torque required. As discussed further below, this particular problem is overcome by use of the turbocharger in a hybrid vehicle according to the invention.

According to the present invention, the waste gate 114 is controlled by the microprocessor 48; except under circumstances when the extra power provided by turbocharging is needed, the waste gate 114 is open (as shown in FIG. 1), so that the engine exhaust essentially bypasses the turbocharger 100. A valve 120, also controlled by microprocessor 48, may also be provided in the duct connecting the air side of the turbocharger 100 and the intake manifold 122 of the engine, so that the engine 40 draws air through the turbocharger only when in use; a second air filter 124 is then also provided.

FIG. 2 shows a graph including several curves representative of the relative torque output characteristics of various engines as functions of engine RPM in solid lines, and typical road loads in dashed lines. Curve A illustrates the torque output of a typical normally-aspirated internal combustion engine as might be used in a relatively heavy vehicle such as a sport-utility vehicle ("SUV"). Such a heavy, aerodynamically inefficient vehicle requires an engine producing significant torque at low RPM in order to provide satisfactory acceleration; consequently, for the reasons discussed above, fuel economy is especially poor.

Curve B shows a torque curve for a conventionally turbocharged engine, as typically implemented for automotive use. Commonly, turbocharging for automotive use is employed in order that relatively small-displacement engines will produce high horsepower at the upper end of their operating range; the other design parameters of such engines (e.g., camshaft profiles) are chosen similarly. Engines thus optimized for high-rpm horsepower produce reduced low-speed torque, that is, are "peaky" compared to normally-aspirated engines. A variable-ratio transmission is essential to obtain reasonable acceleration from low speeds. Stated differently, turbocharging as usually implemented for automotive use provides relatively high torque at the upper end of the engine's speed range, but relatively poor torque at lower speeds; such an engine would be unsuitable in practice of the present invention.

Those of skill in the art will recognize that turbocharged engines are used in heavy-load road vehicle applications, such as trucks and the like, but these vehicles demand transmissions having 12, 16, or more ratios, so that the engine's narrow power peak can be matched to the load, and exhibit extremely poor acceleration, as well as excessive gear-changing and cost, all of which would be unacceptable to the ordinary motorist. Thus, normally-turbocharged engines, of both the low-speed truck type, or the high-speed automotive type, are not satisfactory in implementation of the present invention; neither would allow the vehicle to be propelled solely by the engine in highway cruising without a variable-ratio transmission, as is an important object of the invention.

Curve C is a typical torque curve of an engine as might be used in an SUV or other heavy vehicle according to the invention of the '970 patent and the '817 application. As illustrated, the engine produces less torque than the conventional engine of curve A at all speeds, and so is operated more efficiently during low-load use, such as normal highway cruising; as discussed above, where additional power is needed, the traction motor provides additional torque. According to the present invention, the engine similarly produces torque according to curve C in normally-aspirated mode, for example, during ordinary highway cruising, as illustrated by a first road load curve E. However, if the road load is significantly higher, as illustrated by curve F, for example, if a trailer is being towed or a long hill climbed, so that torque in excess of the engine's maximum normally-aspirated torque output is needed for an extended time, the turbocharger is activated. When thus turbocharged, the engine exhibits a torque curve such as curve D in FIG. 2. As can be seen, its peak torque is typically at least equal to that of the conventional SUV engine of curve A, although typically peak torque will be realized at higher RPM. The difference between the normally-aspirated torque curve C and the turbocharged curve D at a given engine speed, as measured at G, is selected in the design process to be nominally equal to the difference in anticipated road loads, as exemplified by curves E and F, although of course the loads cannot be precisely predicted.

As also noted above, as conventionally employed, the turbocharger is used at all times. By comparison, according to the present invention, the turbocharger is controlled by the microprocessor 48 to be used only under specified driving conditions, so that the engine can be optimized for use in other modes, while still obtaining the high-speed torque production characteristic of turbocharged engines, as illustrated in FIG. 2.

Figure 3:
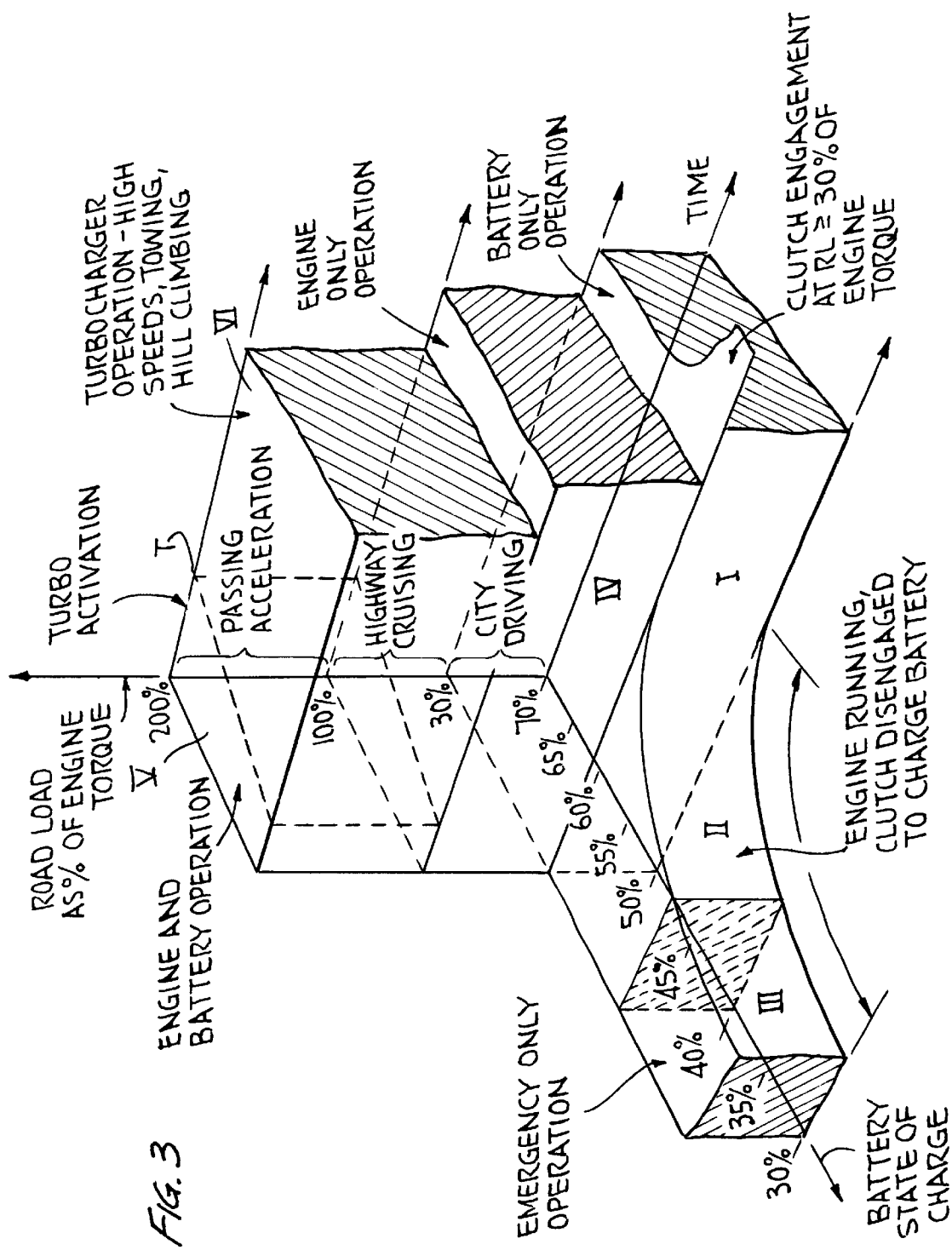
FIG. 3 is a diagram illustrating differing modes of vehicle powertrain operation, plotted on a three-dimensional chart, illustrating that the mode of vehicle operation is a function of the state of charge of the battery bank, the instantaneous road load, and time.

FIG. 3, as indicated above, is a diagram illustrating differing modes of operation of the hybrid vehicle powertrain of the invention; the modes of operation, indicated by numerals I–VI, are plotted on a three-dimensional chart, illustrating that the mode of vehicle operation is controlled by microprocessor 48 responsive to the state of charge of the battery bank, the instantaneous road load, and time. FIG. 4, discussed below, further illustrates the inventive mode of vehicle operation.

FIG. 3 shows on one axis the state of battery charge extending from 70% at the origin outwardly to a minimum value shown of 30%; normally the batteries are maintained at at least 50% of full charge. The road load is shown on a second axis as varying from 0 at the origin to 200% of the engine's maximum torque output. (Negative road load, occurring during descents or under braking, is not shown in FIG. 3 due to the difficulty of illustration. Regenerative battery charging under these circumstances would effectively provide a seventh mode VII of vehicle operation. This circumstance is discussed in connection with FIG. 4, below.) Time is shown on the third axis extending from an arbitrary point at the origin; that is, FIG. 3 shows the mode of the vehicle's operation over the next short period of time (on the order of 30–60 seconds) from a present instant at the origin. Stated differently, according to one aspect of the invention, the microprocessor 48 controls the vehicle's mode of operation at any given time in dependence on "recent history," as well as on the instantaneous road load and battery charge state.

More specifically, FIG. 3 shows that during city driving (region I), defined in this example as driving where the road load is up to 30% of the engine's maximum torque, the vehicle is operated as a "straight electric" car, the clutch being disengaged and energy from the battery bank 22 being used to power traction motor 25 to propel the vehicle, as long as the battery bank is charged to between about 50 and about 70% of its theoretical storage capacity. (It will be appreciated by those of skill in the art that due to variation between individual batteries of the preferred series-connected battery bank, fully charging any one battery would likely result in overcharging others, and that too frequently charging any one battery to 100% of its theoretical full charge is also deleterious.) "70% of full charge" and like values given herein accordingly refer to the state of charge of the battery bank as a whole with respect to the battery bank's theoretical storage capacity. If the charge falls to below 50% of full charge (region II), the engine is started, and the starter motor 21 is operated as a generator to charge the battery bank to substantially 70% of full charge. As indicated, operation of the vehicle as an electric car in region III may also be permitted when the battery bank falls to below 40% of full charge, for example, if there is a fault in the engine or charging system, but only on an emergency basis, and under no circumstances when the state of charge falls below 30% of full charge; such deep discharge is harmful to battery life.

During highway cruising, region IV, where the road load is between about 30% and 100% of the engine's maximum torque, the engine is used alone to propel the vehicle. Accordingly, when the microprocessor detects that transition between regions I and IV is required (e.g., the microprocessor can effectively determine the road load by monitoring the response of the vehicle to the operator's command for more power), it causes the starting motor 21 to spin the engine 40 to starting speed; when a desired starting speed, typically 300 RPM, is reached, the electronic engine management unit 55 and electronic fuel injection unit 56 are controlled to fire the spark plugs and supply fuel, respectively, starting the engine.

As discussed in detail in the '817 application, thus starting the engine at relatively high rpm allows a near-stoichiometric fuel:air mixture to be used, as compared to the much richer mixtures normally used for starting. Emissions of unburned hydrocarbons are thus substantially reduced, and fuel economy improved.

When the speed of the engine output shaft substantially matches that of traction motor 25, clutch 51 is engaged; the power produced by motor 25 is reduced as that produced by engine 40 is increased, so that the transition between modes I and IV is smooth and essentially undetected by the operator.

If the operator then calls for additional power, e.g. for acceleration or passing, region V is entered; that is, the microprocessor detects an increase in road load, and causes energy to flow from the battery bank 22 to traction motor 25, providing torque propelling the vehicle in addition to the provided by engine 40.

To this point (with respect to FIG. 3) the operation of the vehicle is essentially as described in the '817 application. According to the present invention, a further region VI is provided, wherein the turbocharger 100 is activated by the microprocessor 48 when it detects that the road load has exceeded the engine's maximum output for more than a period of time T. Typically these events will occur when the vehicle is towing a trailer or is otherwise heavily laden, is climbing a long hill, or is operated at high speed for a long period of time.

More specifically, when the road load only exceeds the engine's maximum power for a short time, less than T, as during acceleration onto a highway or during passing, the traction motor is employed to provide the additional torque required, as in the '817 application. When the road load exceeds the engine's maximum power for a time greater than T, the turbocharger is energized by closing waste gate 114, and operating valve 120, if provided, to open the duct between the air-side of turbocharger 100 and the intake manifold 122 of engine 40. As the turbocharger "spools up" to its operating speed range, the maximum torque produced by engine 40 increases, and the torque produced by traction motor 25 is gradually reduced. This sequence of events is discussed further below in connection with FIG. 4.

As noted above, turbocharger operation is initiated when the microprocessor 48 detects that the road load has exceeded the engine's maximum power for a time greater than T. FIG. 3 also shows, by the angle of the line separating regions V and VI with respect to the t=0 plane, that T can vary with the state of charge of the battery bank 22; when the battery bank is fully charged, T is longer—that is, energy from the battery bank is used to satisfy road load in excess of the engine's maximum torque output for a longer period—than when the battery bank is relatively less fully charged. The turbocharger can also be operated to provide additional engine power when full acceleration is needed, e.g., upon detection of the operator's aggressively pressing the accelerator pedal down completely.

As mentioned above, FIG. 4, comprising FIGS. 4(a)–(c), and extending over two sheets, is a timing diagram showing the relationship between road load, engine torque output, the state of charge of the battery bank, and operation of the engine in electric car, normally-aspirated and turbocharged modes as these vary over time, during low-speed city driving, highway cruising, and extended high-load driving, thus further illustrating the control strategy employed according to the invention.

FIG. 4(a) shows the vehicle's instantaneous torque requirement, that is, the "road load", by a solid line, and the engine's instantaneous output torque by a dashed line, as these vary over time. The hatched areas between these lines represent flow of energy to or from the battery bank, depending on the circumstances. It will be appreciated that positive vehicle torque demands correspond to steady-state cruising, acceleration, hill-climbing, or the like, while negative vehicle torque requirements correspond to deceleration or descent. The engine's output torque s constrained to the range of efficient operation; as illustrated in FIG. 4, this range is controlled (when normally-aspirated, i.e., except when the turbocharger is operated) to be between 30% and 100% of the engine's maximum torque output ("MTO"); it will be appreciated that the 30% figure, as well as similar figures mentioned herein, may vary without departure from the scope of the invention.

In the example of vehicle operation shown in FIG. 4, initially the vehicle is operated only at road loads below 30% of MTO, that is, in traffic, as indicated at A. Accordingly, all the torque required is provided by the traction motor 25, and the state of corresponds directly to the road load; when the road load is negative, BSC increases as the battery bank is charged by regenerative braking. (It will be appreciated that the changes in BSC are substantially exaggerated in FIG. 4, so as to illustrate the direction of energy flow.)

At point B, the road load exceeds 30% of MTO for the first time on this particular trip. When this is detected by the microprocessor 48, it controls the starting motor 21 to spin the engine 40 at relatively high speed, and preheats the catalytic converter 64, causing a short but substantial drain on BSC, as shown at C. When the engine reaches the desired starting speed, e.g. 300 RPM, and the catalyst reaches a minimum effective operating temperature, e.g. 300–3500° C. (as discussed more fully in provisional application Ser. No. 60/122,477), the engine is started by supply of fuel and firing of its spark plugs, and the clutch is then engaged. As the engine is already rotating at relatively high speed, and has been warmed by compression of air in its cylinders during the starting process, it begins to produce useful torque almost immediately, as indicated at D.

Thereafter, when the vehicle's torque requirement exceeds the instantaneous engine output torque for a period less than T, as at points E–G, one or both of the traction and starting motors 25 and 21 are powered to provide additional torque to the road wheels. Where the engine's instantaneous torque output exceeds the vehicle's torque requirement, but the battery is relatively fully charged, as at point H, the engine's torque output is reduced to match the road load; when MTO exceeds the road load, and BSC falls below a predetermined level, as at I and J, the engine is used to charge the batteries, as indicated at K and L. When the vehicle's torque requirement is less than the minimum efficient engine torque output, as at M, the engine is again used to charge the batteries; when the road load becomes negative, as at N, regenerative braking is also performed, further charging the batteries, and the engine may be shut off entirely. When the road load is negative and the batteries become substantially fully charged, e.g., during a long descent, as at N, mechanical braking is employed as needed to slow the vehicle.

The rate of change of the engine's torque output is limited, e.g., to 2% or less per revolution, as indicated by noting that the dashed line in FIG. 4(a), indicating the instantaneous engine output torque, lags the solid line indicating the vehicle's instantaneous torque requirement. Thus limiting the rate of change of engine output torque is preferred to limit undesirable emissions and improve fuel economy; that is, as the stoichiometric fuel/air ratio varies somewhat as the load changes, simply opening the throttle and causing additional fuel to be injected upon the operator's depressing the accelerator pedal will result in non-stoichiometric, inefficient combustion. The maximum permissible rate of change of engine output torque also may be varied in accordance with the state of charge of the batteries; more specifically, if the batteries are relatively discharged, it may be preferable to allow the engine's output torque to ramp-up more quickly than otherwise, in order to limit the amount of electrical power drawn from the batteries in response to an acceleration command. More generally, it is preferred to operate the engine so as to limit the amount of power drawn from the batteries, as there are unavoidable losses attendant on conversion of energy stored in the batteries to motor output torque, and during the corresponding recharging period.

The mode of operation of the vehicle of the invention as described above with respect to FIG. 4 is essentially similar to that shown in the '817 application. According to the present invention, turbocharger 100 is provided to increase the maximum torque available from engine 40; turbocharger 100 is controlled by the microprocessor to further improve the efficiency of operation and performance of the vehicle, by making high power available from the engine when required for relatively long periods of time.

Thus, as shown in FIG. 4(a) at $t_1$, $t_2$, $t_3$, and $t_4$, the microprocessor monitors the length of time t during which road load exceeds 100% of MTO, and compares t continually to a value T preferably varied in accordance with BSC; this is shown by the relative lengths of the arrows marked T on FIG. 4(b). While t<T, as at E, F, and G in FIG. 4(a), the excess torque required by the road load is provided by either or both of the traction and starting motors, drawing power from the battery bank. Note that the motors together are rated to be capable of continuously providing torque up to at least 100% of MTO, in accordance with the '970 patent; this allows the motors to provide adequate torque for good vehicle performance without a variable-ratio transmission. The motors may also be overdriven to provide more than their rated torque, well over 100% of MTO, for short periods of time, t<T, as at F; as noted, according to an important aspect of the invention, where torque in excess of MTO is needed for a longer period of time, t>T, the turbocharger is activated.

Thus, when $t_4 \geq T$, as at P, the microprocessor activates the turbocharger essentially as discussed above, that is, by closing waste gate 114 and valve 120 (if provided). As the turbocharger "spools up", which may take some seconds, and the boost it provides increases, as indicated at Q, the torque provided by the traction motor (and possibly also by the starting motor) is decreased accordingly, as indicated at R. The operator need not be aware of or take any action to initiate the turbocharger's activation; this is controlled by the microprocessor in response to monitoring the road load over time and the state of charge of the battery bank.

As discussed in connection with both FIGS. 3 and 4, T is preferably varied in accordance with BSC, so that the turbocharger is activated relatively sooner when BSC is relatively low; this limits the amount of energy drained from the battery during operation of the engine and the traction motor (or both motors) when the road load exceeds 100% of MTO, so that BSC does not fall to an undesirably low value.

Those of skill in the art will recognize that provision of a microprocessor-controlled turbocharger in a hybrid vehicle according to the invention permits operation in an additional mode, providing increased flexibility in the operational scheme provided; essentially the turbocharger provides a larger engine only when needed, at no cost in efficiency at other times. This is particularly significant in meeting the goals of the hybrid vehicle of the invention. More specifically, in addition to the operational advantages noted, provision of an engine having a "turbocharger-on-demand" in the hybrid vehicle according to the invention allows the engine to be smaller than otherwise, that is, to provide adequate highway performance in a vehicle of a given weight. As the starting motor/generator must be sized such that when it is operated to charge the batteries (e.g., in extended city driving) it loads the engine adequately that the engine is operated efficiently, employment of a smaller engine allows use of a smaller generator motor. For similar reasons, provision of a smaller engine allows it to be used to efficiently propel the vehicle in highway driving commencing at lower average speeds, resulting in turn in better fuel economy. By providing the "turbocharger-on-demand" according to the invention, all these advantages can be realized without sacrifice in the ultimate performance of the vehicle.

As noted above, one convenient implementation of the "turbocharger-on-demand" according to the invention is to operate the wastegate by a solenoid or the like controlled by the microprocessor, that is, to employ the wastegate as a bypass valve except when turbocharged operations are desired. A separate bypass valve might also or alternatively be provided. The wastegate is still preferably implemented as a spring-loaded relief valve, as illustrated in FIG. 1, and as generally conventional, to limit the "boost" provided. It is also within the invention to operate the waste gate to take intermediate positions, that is, between fully-open and closed positions, so as to limit the torque to limit wheelspin as detected, and to keep the turbocharger wheels spinning at an intermediate speed, to reduce the time necessary to "spool up" to full speed. It is also within the invention to adjust the wastegate responsive to an atmospheric-pressure signal provided by a suitable sensor 107 to ensure that adequate boost is provided at higher altitudes to ensure vehicle performance.

It will also be appreciated that a supercharger, that is, a positive-displacement air pump driven by the engine, could be used to implement the differing modes of vehicle operation illustrated in FIGS. 3 and 4; for example, the supercharger's operation could be controlled by the microprocessor by driving it through an electrically-controlled clutch, and this is accordingly within the invention. However, this would be less efficient than turbocharger operation, as turbocharging effectively recovers some of the waste heat in the engine exhaust by compressing the air reaching the inlet manifold, while supercharging consumes engine torque. Turbocharging, as discussed in detail, is accordingly preferred.

It will therefore be appreciated that by providing the internal-combustion engine of a hybrid vehicle with a turbocharger controlled by the vehicle's controller to operate only during extended periods of high torque requirements, a number of important advantages are realized, both as compared to a conventional system wherein the turbocharger is continually activated, or as compared to a large engine having the same maximum torque as the smaller turbocharged engine. As to the latter, as explained above all internal combustion engines are extremely inefficient, except when operated at near peak torque output; the larger the engine, the less frequently this will occur. As to the former, employing a conventionally-turbocharged engine, having the typical "peaky" torque curve, would not allow the engine to be used to propel the vehicle during highway driving without a variable-speed transmission. Instead, by providing a "turbocharger-on-demand", that is, which is only employed when it is actually needed, the vehicle of the invention can employ a small engine optimized for its main function of propelling the vehicle efficiently during highway cruising, and which is operable as a much larger engine when needed.

Other advantages provided by the invention include the following: As the wastegate is normally open, the exhaust temperature will stay high, optimizing catalytic converter performance; as conventionally implemented, cooling of the exhaust gases as their energy is removed in spinning the turbocharger rotor can prevent good catalytic converter performance, especially at low speeds. As noted, the maximum turbocharger boost pressure can be readily controlled in response to measured variation in barometric pressure, in order to provide the same performance under all conditions without overstressing the engine.

When constructed and operated according to the invention, that is, as a hybrid vehicle having an internal-combustion engine with a turbocharger controlled by the vehicle's controller to operate only during extended periods of high torque requirements, even a heavy vehicle having poor aerodynamic characteristics, such as a sport-utility vehicle or van, can offer good acceleration and hill-climbing and towing ability, while still providing extremely good fuel economy and extremely low emissions.

Another aspect of the invention concerns the method of sizing the various components of the system. Examples were given above of component selection for a vehicle according to the invention of the '817 application, that is, not including a turbocharger according to the present invention. Using as a further example a 5,500 pound "sport-utility vehicle" ("SUV") required to have reasonable acceleration and passing performance even while towing a 6,000 pound trailer, sizing of the components of the hybrid drive system of the present invention is preferably accomplished as follows:

1. An internal combustion engine is selected which has sufficient torque to drive the SUV without trailer at medium to high speed along a moderate grade. An engine of 100 hp at 6,000 maximum RPM is appropriate.

2. If a trailer is to be towed, a turbocharger, operated as above, is added. The turbocharger is sized so that when it is operated the engine provides 140 hp.

3. The charger motor is sized so as to provide an engine load equal to approximately 70% of the engine's maximum torque at a suitable engine speed. In this way fuel is used efficiently during battery charging, as discussed above. In the example, the charger motor is preferably an induction motor of 30–40 hp capacity configured as a "faceplate" or "pancake" type, essentially forming the flywheel of the engine. Such a motor can be operated as a generator requiring 20–22 hp, which is 70% of the maximum torque produced by the engine specified above at 1200–1500 rpm; battery charging can thus be accomplished in a very fuel-efficient manner.

4. The traction motor is sized to provide adequate torque at zero speed to overcome the maximum grade specified from rest, with the starter motor assisting as needed. In the example the traction motor may be an induction motor of 100 hp, with a maximum speed of 16,000 rpm, and be connected to the drive wheels through a chain drive providing the appropriate reduction ratio. It will be appreciated that in this example the total torque available from the starting and traction motors combined exceeds that provided by the engine, in accordance with an aspect of the invention of the '970 patent.

5. The torque vs. speed profile of the traction motor is selected to allow city driving, in particular, to provide acceleration sufficient to conform to the Federal urban driving fuel mileage test ("FUDS"), without use of torque from the engine.

6. The battery capacity is then selected to provide sufficient cycle life, i.e., so as not to be overstressed by deep discharge over many repetitive driving cycles. In the example, an 800 v, 8.5 KAH battery pack is provided.

7. Finally, the controller is provided with software to implement the control scheme described in detail above, that is, to use the traction motor as the only source of drive torque at low speed, to start the engine when the road load increases beyond a setpoint, to operate the turbocharger when the road load exceeds the engine's maximum torque for more than a prescribed time T, which may be varied in accordance with the state of charge of the batteries, and otherwise as described above.

Simulations show that an SUV configured as above (without trailer) should be capable of 40 miles per gallon, while providing road performance equivalent to conventional SUVs typically returning fuel economy of only 15 mpg.

While a preferred embodiment of the invention has been disclosed, and various alternatives mentioned, the invention is not to be limited thereby; note in particular that the various specific numerical values given in explanation of the various modes of vehicle operation are exemplary only, and do not limit the invention.

What is claimed is:

1. A hybrid vehicle, comprising:
   a controller capable of accepting inputs indicative of vehicle operating parameters and providing control signals in response to a control program;
   a battery bank;
   an internal combustion engine, comprising a turbocharger that is operable in response to control signals from said controller;
   a first electric motor electrically coupled to said battery bank for (a) accepting electrical energy from said battery bank and (b) providing electrical energy to said battery bank, and said first motor being mechanically coupled to said internal combustion engine, the combination of said internal combustion engine and said first electric motor being mechanically coupled to a clutch controlled by said controller for controllable torque-transmitting connection between said combination and road wheels of said vehicle,
   said first motor being responsive to commands from said controller, such that said first electric motor can be controlled to (1) accept torque from said engine to charge said battery bank, (2) accept energy from said battery bank to apply torque to said engine for starting said engine, (3) accept energy from said battery bank to apply torque to said road wheels to propel said vehicle, and (4) accept torque from said road wheels to charge said battery bank; and
   a second electric motor, electrically coupled to said battery bank, such that said second electric motor can be controlled for (a) accepting electrical energy from said battery bank and (b) providing electrical energy to said battery bank, said second motor being mechanically coupled to road wheels of said vehicle and being responsive to commands from said controller in order to control said second electric motor to (1) accept energy from said battery bank to apply torque to said road wheels to propel said vehicle, and (2) accept torque from said road wheels to charge said battery bank; and
   wherein said controller monitors the instantaneous road load experienced by said vehicle as a function of time, and causes said turbocharger to operate, increasing the maximum output torque of said engine, only when the instantaneous road load exceeds the engine's normally-aspirated maximum torque output for more than a predetermined period of time.

2. The hybrid vehicle of claim 1, wherein said controller is provided with signals indicative of the instantaneous road load experienced by said vehicle and of the state of charge of said battery bank, and controls operation of said engine, said clutch, said first and second motors, and said turbocharger, so that said vehicle is operated in a plurality of operating modes responsive to said signals.

3. The hybrid vehicle of claim 2, wherein said signal indicative of the instantaneous road load experienced by said vehicle is determined by said controller at least in part by monitoring commands provided by the vehicle operator.

4. The hybrid vehicle of claim 2, wherein road load (RL) is expressed as a percentage of the maximum torque output of the engine while normally-aspirated (MTO), and said operating modes include:

a low-speed mode I, wherein said vehicle is propelled by torque provided by said traction motor in response to energy supplied from said battery bank, while RL<SP, wherein SP is a setpoint expressed as a predetermined percentage of MTO, a highway cruising mode IV, wherein said vehicle is propelled by torque provided by said engine in response to supply of combustible fuel, while SP<RL<100% of MTO, an acceleration mode V, wherein said vehicle is propelled by torque provided by said engine in response to supply of combustible fuel and by torque provided by said traction motor in response to energy supplied from said battery bank, while RL>100% of MTO, and a high-power mode VI, wherein said turbocharger is operated such that said vehicle is propelled by torque provided by said engine in response to supply of combustible fuel while RL>100% of MTO for more than a predetermined time T.

5. The hybrid vehicle of claim 4, wherein said clutch is disengaged during operation in mode I and engaged during operation in modes IV, V, and VI.

6. The hybrid vehicle of claim 4, wherein said time T is controlled responsive to the state of charge of the battery bank.

7. A method for controlling the operation of a hybrid vehicle operable in a plurality of differing modes, said vehicle comprising an internal combustion engine for providing torque up to a maximum normally-aspirated torque output (MTO), said engine being controllably coupled to road wheels of said vehicle by a clutch, a turbocharger being operatively and controllably coupled to said engine for increasing the maximum torque output of said engine to more than MTO when desired, a traction motor being coupled to road wheels of said vehicle, a starting motor coupled to said engine, both said motors being operable as generators, a battery bank for providing electrical energy to and accepting energy from said motors, and a controller for controlling operation of said engine, clutch, turbocharger, and first and second motors, and controlling flow of electrical energy between said motors and said battery bank, wherein according to said method, said controller controls selection of the operational mode of said vehicle between a low-speed mode I, a cruising mode IV, an acceleration mode V, and a sustained high-power mode VI, wherein torque to propel said vehicle is provided by said traction motor, said engine, both said traction motor and said engine, and said engine with said turbocharger operating, respectively, in response to monitoring the instantaneous torque requirements (RL) of the vehicle.

8. The method of claim 7, wherein said controller controls said vehicle to operate in said low speed mode I while RL<SP, wherein SP is a setpoint expressed as a predetermined percentage of MTO, in said highway cruising mode IV while SP<RL<100% of MTO, in said acceleration mode V while RL>100% of MTO, and in said sustained high-power mode VI while RL>100% of MTO for more than a predetermined time T.

9. The method of claim 8, comprising the further step of disengaging said clutch during operation in mode I and engaging said clutch during operation in modes IV, V, and VI.

10. The method of claim 8, wherein said time T is controlled responsive to the state of charge of the battery bank.

11. A method for determining the relative sizes of the internal combustion engine, starting/charging and traction motors, and battery bank of a hybrid vehicle of given weight comprising said components, said method comprising the steps of:

a. Selecting a normally-aspirated internal combustion engine sized such that the engine is required to generate at least about 30% of its maximum torque output while propelling said vehicle at medium to high speed along a moderate grade;

b. Sizing the starting/charging motor to provide an engine load during battery charging equal to at least about 30% of the maximum torque output of the engine selected in step (a);

c. Sizing the traction motor with respect to the weight of said vehicle to provide adequate torque at zero speed to overcome the maximum grade specified from rest, with the starting/charging motor selected in step (b) assisting as needed;

d. Selecting the torque vs. speed profile of the traction motor selected in step (c) to allow convenient city driving, without use of torque from the engine; and e. Sizing the battery capacity with respect to the starting/charging motor selected in step (b) to be sufficient to avoid excessively frequent discharging and charging cycles, while being able to accept charging current responsive to said engine load during battery charging being equal to at least about 30% of the engine's maximum torque output; and f. Sizing the battery power capacity to provide sufficient power to both motors to provide desired maximum acceleration.

12. The method of claim 11, wherein said engine is provided with a turbocharger controlled to increase the engine's maximum torque output during extended operation at high power, wherein the turbocharger increases the engine's maximum torque output by at least about 25%.

13. The method of claim 11, wherein the maximum power delivered to the wheels of said vehicle by said normally-aspirated engine is less than or equal to the maximum power delivered to the wheels of said vehicle by said starting/charging and traction motors.

14. A method for determining the relative sizes of the internal combustion engine, starting/charging and traction motors, and battery bank of a hybrid vehicle comprising said components, said method comprising the steps of:

a. Selecting an internal combustion engine that is provided with a turbocharger so as to be operable in normally-aspirated and turbocharged modes of operation, wherein the turbocharger increases the engine's normally-aspirated maximum torque output by at least about 25%, and wherein said engine is sized do that the engine generates at least about 30% of its maximum output torque, while propelling the vehicle without trailer at medium to high speed along a moderate grade in normally-aspirated mode;

b. Sizing the starting/charging motor to provide an engine load during battery charging equal to at least about 30% of the engine's maximum torque output;

c. Sizing the traction motor to provide adequate torque at zero speed to overcome the maximum grade specified from rest, with the starter motor assisting as needed;

d. Selecting the torque vs. speed profile of the traction motor to allow convenient city driving, without use of torque from the engine; and e. Sizing the battery capacity to be sufficient to avoid excessively frequent discharging and charging cycles, while being able to accept charging current responsive to said engine load during battery charging being equal to at least about 30% of the engine's maximum torque output; and f. Sizing the battery power capacity to provide sufficient power to both motors to provide desired maximum acceleration.

15. The method of claim 14, wherein the maximum power delivered to the wheels of said vehicle by said engine in normally-aspirated mode is less than or equal to the maximum power delivered to the wheels of said vehicle by said starting/charging and traction motors.

* * * * *